(12) United States Patent
Namaky

(10) Patent No.: US 7,974,750 B2
(45) Date of Patent: Jul. 5, 2011

(54) CELLULAR PHONE CONFIGURED WITH OFF-BOARD DEVICE CAPABILITIES AND STARTER/CHARGER AND BATTERY TESTING CAPABILITIES

(75) Inventor: Hamid Namaky, South Russell, OH (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 12/829,988

(22) Filed: Jul. 2, 2010

(65) Prior Publication Data

US 2010/0273477 A1    Oct. 28, 2010

Related U.S. Application Data

(60) Continuation of application No. 12/274,891, filed on Nov. 20, 2008, now Pat. No. 7,751,953, which is a continuation of application No. 11/785,992, filed on Apr. 23, 2007, now Pat. No. 7,463,959, which is a division of application No. 10/437,154, filed on May 13, 2003, now Pat. No. 7,209,813.

(51) Int. Cl.
*G06F 19/00* (2006.01)
(52) U.S. Cl. ......................................... 701/29
(58) Field of Classification Search ........... 701/29, 701/33, 36; 702/182–185; 307/9.1, 10.1, 307/10.6, 10.7
See application file for complete search history.

(56) References Cited

U.S. PATENT DOCUMENTS

| | | | |
|---|---|---|---|
| 5,555,498 A | 9/1996 | Berra et al. | 364/424.03 |
| 5,619,412 A | 4/1997 | Hapka | |
| 5,787,366 A | 7/1998 | Adams | |
| 5,884,202 A | 3/1999 | Arjomand | |
| 5,916,286 A | 6/1999 | Seashore et al. | 701/29 |
| 5,950,149 A | 9/1999 | Fieramosca et al. | 702/183 |
| 6,006,146 A | 12/1999 | Usui et al. | 701/29 |
| 6,181,994 B1 | 1/2001 | Colson et al. | |
| 6,321,151 B1 | 11/2001 | Shultz | |
| 6,362,730 B2 | 3/2002 | Razavi et al. | 340/438 |
| 6,452,597 B1 | 9/2002 | Goldberg et al. | |
| 6,459,969 B1 | 10/2002 | Bates et al. | 701/29 |
| 6,505,106 B1 | 1/2003 | Lawrence et al. | 701/35 |
| 6,529,723 B1 | 3/2003 | Bentley | |
| 6,535,112 B1 | 3/2003 | Rothschink | |
| 6,553,292 B2 | 4/2003 | Kokes et al. | |

(Continued)

FOREIGN PATENT DOCUMENTS

EP    0242099 A2    10/1987

(Continued)

OTHER PUBLICATIONS

Iris in Your Palm.

(Continued)

*Primary Examiner* — Yonel Beaulieu
(74) *Attorney, Agent, or Firm* — Baker & Hostetler LLP

(57) ABSTRACT

The present invention is directed toward a cellular phone that connects to an existing vehicle data link to perform the functions of an off-board device, such as a scan tool, for displaying diagnostic information relating to vehicles. In addition, the cellular phone connects to a starter/charger system and/or a battery to perform the functions of a starter/charger/battery testing device. Such a device allows a user to connect the cellular phone to a data link connector located in a vehicle, download software to either an adaptor or the cellular phone, retrieve information relating to diagnostic tests on the vehicle and view the results on the cellular phone display, and/or communicate the results to another person or device.

13 Claims, 9 Drawing Sheets

U.S. PATENT DOCUMENTS

| | | | |
|---|---|---|---|
| 6,701,232 B2 | 3/2004 | Yamaki | |
| 6,701,233 B2 | 3/2004 | Namaky et al. | 701/33 |
| 6,714,846 B2 | 3/2004 | Trsar et al. | 701/33 |
| 6,718,425 B1 | 4/2004 | Pajakowski et al. | 710/315 |
| 6,728,603 B2 | 4/2004 | Pruzan et al. | |
| 6,766,233 B2 | 7/2004 | Odinak et al. | |
| 6,792,297 B2 | 9/2004 | Cannon et al. | 455/573 |
| 6,803,854 B1 | 10/2004 | Adams et al. | |
| 6,807,469 B2 | 10/2004 | Funkhouser et al. | 701/33 |
| 6,907,445 B2 | 6/2005 | Pellegrino et al. | |
| 6,920,380 B2 | 7/2005 | McClure et al. | |
| 6,941,203 B2 | 9/2005 | Chen | |
| 6,957,133 B1 | 10/2005 | Hunt et al. | |
| 7,130,666 B2 | 10/2006 | Eisenbraun | 455/573 |
| 7,198,510 B2 | 4/2007 | Bertness | 439/500 |
| 7,209,813 B2 | 4/2007 | Namaky | 701/29 |
| 7,269,482 B1 | 9/2007 | Shultz et al. | |
| 7,299,127 B2 | 11/2007 | Willer et al. | |
| 7,363,149 B2 | 4/2008 | Klausner et al. | |
| 7,415,243 B2 | 8/2008 | Yuhara et al. | |
| 7,463,959 B2 | 12/2008 | Namaky | 701/29 |
| 7,705,602 B2 * | 4/2010 | Bertness | 324/426 |
| 7,734,287 B2 | 6/2010 | Ying | |
| 7,778,750 B2 | 8/2010 | Knight et al. | |
| 2002/0004694 A1 | 1/2002 | McLeod et al. | |
| 2002/0007237 A1 | 1/2002 | Phung et al. | |
| 2002/0049535 A1 | 4/2002 | Rigo et al. | |
| 2002/0183904 A1 | 12/2002 | Sakurai et al. | 701/33 |
| 2003/0093199 A1 | 5/2003 | Mavreas | |
| 2003/0117298 A1 | 6/2003 | Tokunaga et al. | |
| 2005/0266891 A1 | 12/2005 | Mullen | 455/567 |
| 2006/0158154 A1 | 7/2006 | Maurilus | 320/115 |

FOREIGN PATENT DOCUMENTS

| | | |
|---|---|---|
| FR | 2812437 | 2/2002 |
| GB | 2288892 | 1/1995 |
| WO | 0217184 A1 | 2/2002 |
| WO | 03077205 A2 | 9/2003 |

OTHER PUBLICATIONS

Auto Tap OBDII—Diagnostic Scanner B&B Electronics Manufacturing Co.

AutoLogic User Driven Innovation Pocket Orb, Pocket Smoke, Pocket Gas.

OTTOScan.

OMITEC—OmniConnect.

Mark Coleman, Ford Motor Co., SST-Small Service Tool, Motor City User Group, Dec. 21, 2001.

Campos et al. A Reference Architecture for Remote Diagnostics and Prognostics Applications. IEEE Autotestcon Proceedings [Onlinej2002, pp. 842-853.

EPA: Performing OnBoard Diagnostic System Checks as Part of a Vehicle Inspection and Maintenance Program. http://www.epa.gov/OMS/regs/im/obd/r01015.pdf (Accessed Jan. 28, 2010).

Lind et al. "The Network Vehicle—A Glimpse into the Future of Mobile Multi-Media". IEEE Aerospace and Electronic Systems Magazine [Onlinej1999, vol. 14, Issue 9, pp. 27-32.

Wiksten et al. "Monitor—An Automatic Bus Location and Communications System for Chicago". 30th IEEE Vehicular Technology Conference [Online] 1980, pp. 407-412.

* cited by examiner

CELLULAR PHONE CONFIGURED WITH OFF-BOARD DEVICE CAPABILITIES AND STARTER/CHARGER AND BATTERY TESTING CAPABILITIES

CROSS-REFERENCE TO RELATED APPLICATIONS

This application claims priority to and is a continuation of U.S. patent application Ser. No. 12/274,891, entitled, "Cellular Phone Configured with Off-Board Device Capabilities and Starter/Charger and Battery Testing Capabilities," filed Nov. 20, 2008, now U.S. Pat. No. 7,751,953, which claims priority to and is a continuation of U.S. patent application Ser. No. 11/785,992, entitled "Cellular Phone Configured with Off-Board Device Capabilities and Starter/Charger and Battery Testing Capabilities," filed Apr. 23, 2007, now U.S. Pat. No. 7,463,959, which claims priority to and is a division of U.S. patent application Ser. No. 10/437,154, entitled "Cellular Phone Configured with Off-Board Device Capabilities and Starter/Charger and Battery Testing Capabilities," filed May 13, 2003, now U.S. Pat. No. 7,209,813, the disclosures of which are hereby incorporated by reference in their entirety.

FIELD OF THE INVENTION

The present invention relates generally to electrical testing equipment, and, more particularly, to a cellular phone configured to connect to a vehicle diagnostic system to perform the functions of an off-board device, such as a scan tool, for retrieving and viewing diagnostic information relating to the vehicle.

BACKGROUND OF THE INVENTION

Modern vehicles typically have a vehicle diagnostic system, including one or more separate computer control modules. Examples of such computer control modules (also known as just "modules") are: a powertrain control module (PCM), an engine control module (ECM), a transmission control module (TCM), an ABS control module, and an air bag control module.

"Off-board devices," such as scan tools and code readers are known in the art. Scan tool and code reader testing devices interface with vehicle diagnostic systems to, e.g., access, display, and/or print vehicle diagnostic information. OBD II (On-Board Diagnostics version II) Scan Tools are one commonly known type of scan tool and are governed by a number of standards, e.g., SAE J1978 Rev. 1998-02 and SAE J1979 Rev. 1997-09. Scan tools are relatively expensive diagnostic devices that have a relatively large number of features and are typically marketed to professional automobile mechanics and service stations. Scan tools are generally considered to be beyond the means of most automobile hobbyists and the ordinary individual interested in performing simple maintenance or service of a few vehicles, such as a family "fleet" of vehicles.

There are different types of scan tools. An "OBD II Scan Tool" complies with the above-identified specifications. By contrast, a "Manufacturer-Specific Scan Tool" is a scan tool that accesses and displays proprietary manufacturer-specific data (and possibly also additionally accesses and displays OBD II data). Examples include Device Controls on General Motors, On-Demand Tests in Ford, Actuator Tests, Sensor Tests, Interrogator, and Read Temporary Codes in Chrysler. In general, air bag data, ABS data, cruise control data, and climate control data are also considered to be proprietary manufacturer-specific data and are typically included only in Manufacturer-Specific Scan Tools.

An "off-board device" that is a low-cost alternative to the scan tool is a "code reader." In 1998 Actron Manufacturing Corp., the assignee of the present invention, pioneered the first OBD II code reader. In contrast with a scan tool, a code reader is a relatively basic "off-board device" that links with one or more computer modules in a vehicle diagnostic system via a vehicle computer network, reads any diagnostic trouble codes (also referred to as just "diagnostic codes" herein) asserted by those vehicle diagnostic systems, and displays any diagnostic codes on a display. Typical code readers do not perform the following major functions that are performed by typical scan tools: "View Data," also known as "Live Data," "Data," and "Data Test, DTC" (viewing and displaying in real-time live, changing data from a plurality of module sensors), display of textual diagnosis descriptions corresponding to the various diagnostic codes, recording and playback of data, device control (manually controlling modules for diagnostic purposes), and reading and displaying vehicle information from the vehicle's computer (e.g., VIN information, controller calibration identification number, etc.). Code readers are typically marketed to automobile hobbyists and non-professionals who are merely curious about what codes the various vehicle diagnostic systems have stored in their memories.

Off-board devices typically do not include test circuits. Rather off-board devices, such as scan tools and code readers, typically communicate with the vehicle diagnostic system, which does typically include one or more test circuits. Thus, typical off-board devices do not perform any tests themselves; with few exceptions (e.g., the NGS scan tool with its harness tester, "sensor simulation"), off-board devices merely report the results of tests performed by test circuitry external to the off-board device.

One expense involved in manufacturing scan tools is the costs of the parts, such as the processor, circuit boards, display, housing and input keys. Another expense associated with scan tools is the software that needs to be installed on the device. There are many different makes and models of automobiles, many of which have specialized codes and error messages. In addition, since vehicle manufacturers add new equipment, codes and faults, it is often necessary to update the software to include the new codes and faults every time a new model year is introduced. Further, most scan tools are equipped to handle the communications protocols and error/fault messages of most, if not all, of the vehicles on the market. This requires the scan tool to store a large number of error/fault codes and many different communications protocols. As a result, the cost of the scan tool is beyond the reach of the average back yard mechanic, who only has one or two automobiles.

Cellular phones are commonplace in today's society and have processors, circuit boards, displays, housings and input keys. Further, most cellular phone service providers offer free cellular phones to people who sign a contract to use the provider's service for a minimal period of time, generally two years. At the end of the two year contract, most people simply discard the old cellular phone and obtain a new cellular phone with a new contract. Further due to economies of scales, cellular phones have become inexpensive and common place.

SUMMARY OF THE INVENTION

The present invention is directed toward a cellular phone that connects to an existing vehicle data link to perform the functions of an off-board device, such as a scan tool, for displaying diagnostic information relating to vehicles. In addition, the cellular phone connects to a starter/charger system or a battery to perform the functions of a starter/charger/battery testing device.

Such a device allows a user to connect the cellular phone to a data link connector located in a vehicle, and/or a starter/charger/battery system via an adaptor, download software to either the adaptor or the cellular phone, retrieve information relating to diagnostic tests on the vehicle and/or diagnostic tests on the starter/charger system and view the results on the cellular phone display, and/or communicate the results to another person or device.

The present invention provides a low cost portable off-board device for viewing and/or recording live data, for example vehicle emissions testing station (VETS) data, diagnosing faults and/or errors in vehicle computer systems that allows a user to download the required error and/or fault codes that are specific to the year, make and model of one or more automobiles, or upload the data to remote location for interpretation of the information received from the vehicle diagnostic system.

The present invention provides a low cost portable off-board device for testing the emissions output of a vehicle and transmitting the data to an inspection & maintenance station wherein the inspector can test vehicle emissions and transmit the test results to the inspection station location apart from the inspection station.

The present invention further allows the user to diagnose errors/faults in the vehicle and transport the diagnostic results to an automotive parts supplier, who can assist the user in obtaining the necessary parts to correct the cause of the fault/error, or upload the information to a centralized station for detailed analysis.

Still yet, the present invention allows a user to update the software in a location remote from a computer.

Another embodiment of the present invention provides a low cost portable off-board device that does not require scanning software, wherein the off-board device gathers the raw diagnostic information and communicates the information to a centralized station to be analyzed.

The present invention further provides a low cost starter/charger/battery testing device.

These and other advantages of the present invention will become more apparent from a detailed description of the invention.

BRIEF DESCRIPTION OF THE DRAWINGS

In the accompanying drawings, which are incorporated herein and constitute a part of this specification, embodiments of the invention are illustrated, which, together with a general description of the invention given above, and the detailed description given below, serve to example the principles of this invention, wherein.

DETAILED DESCRIPTION

In general, the present invention includes an adaptor that interfaces between a cellular phone having a processor and an existing vehicle data link connector. The existing vehicle data link is connected to a vehicle diagnostic system. The adaptor places the processor of the cellular phone in circuit communication with the vehicle diagnostic system.

"Circuit communication" as used herein indicates a communicative relationship between devices. Direct electrical, electromagnetic, and optical connections and indirect electrical, electromagnetic, and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers, Bluetooth communications links, 802.11b, or even satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, e.g., a CPU, are in circuit communication.

As discussed earlier, most modern vehicles have one or more computer modules that are linked together along a common data bus. The modules and common data bus together form the vehicle diagnostic system. Vehicles equipped with vehicle diagnostic systems generally have a data link connector located in the occupant compartment of the vehicle, however data link connectors can be located anywhere on the vehicle. The data link connector is connected to the vehicle diagnostic system. The purpose of the data link connector is to facilitate the connection of a scan tool that can be used to read the error/fault codes that are generated by the vehicle computer modules.

Figure 1A:
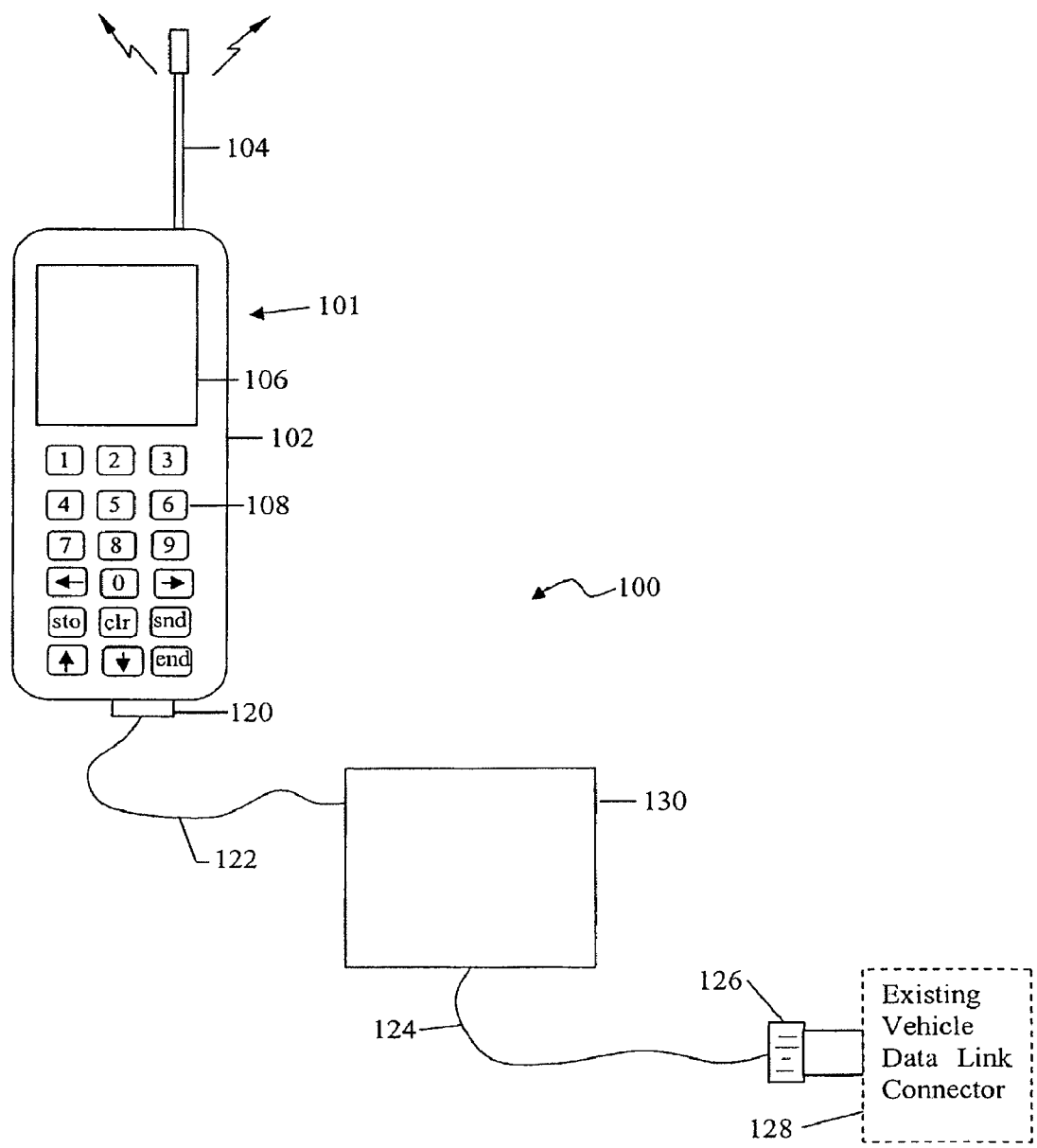
FIG. 1A is a schematic view of a cellular phone connected to an existing vehicle data link via an adaptor in accordance with one embodiment of the present invention.

FIG. 1A illustrates a scan tool 100 in accordance with one embodiment of the present invention. The scan tool 100 includes a cellular phone 101, a DLC adaptor 130, and a data link connector (DLC) 126 all in circuit communication with the existing vehicle diagnostic system via the existing vehicle data link connecter 128.

Figure 2:
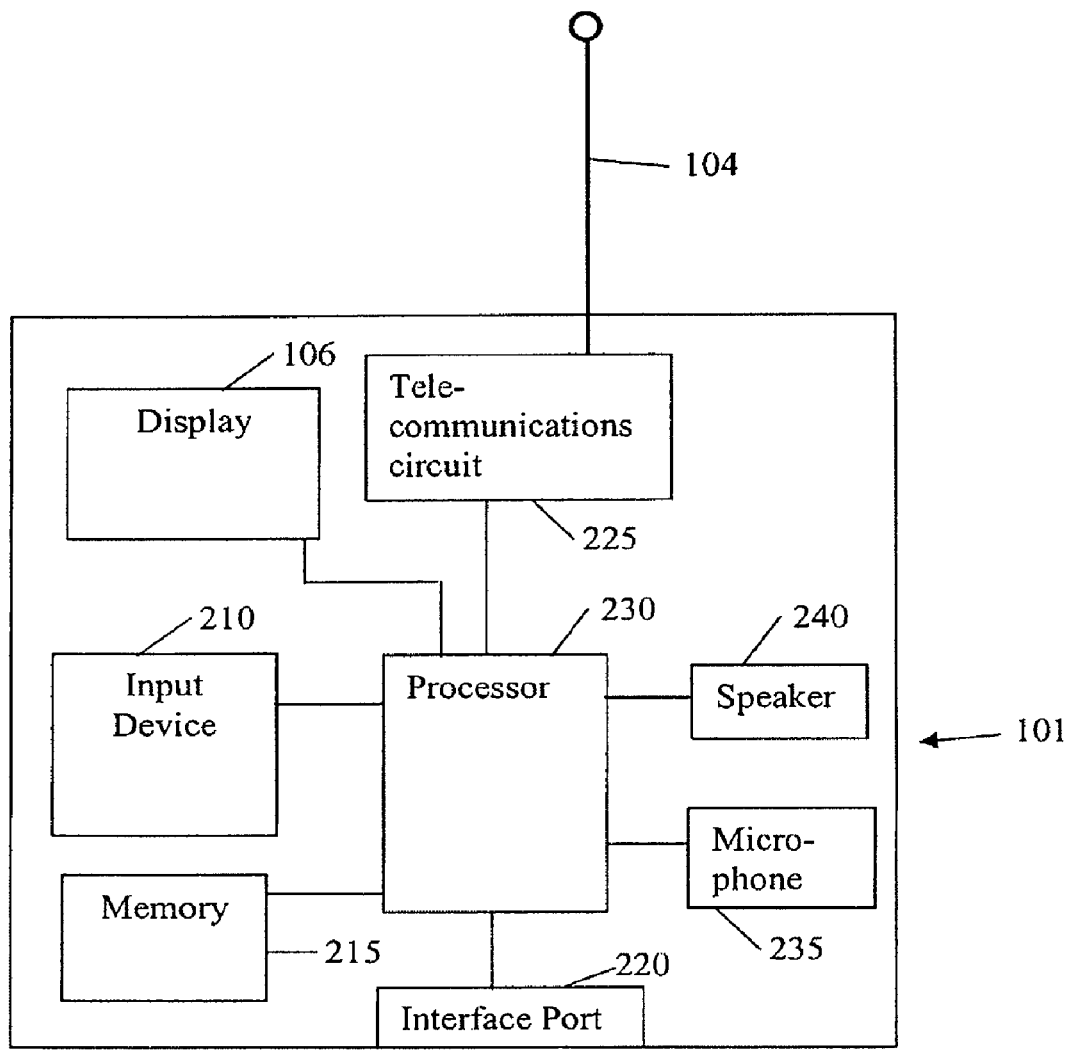
FIG. 2 is a high level block diagram of a typical cellular phone in accordance with one embodiment of the present invention.

The cellular phone 101, as will be described in more detail below, includes a housing 102, an antenna 104, a display 106, a plurality of input keys 108, and an interface port 220 (FIG. 2). The interface port 220 can be any type of communications interface port, such as a serial port, a USB port, an infrared port, an RS 232 port, a port that is proprietary to the manufacturer of the cellular phone 101, or any other conventional communications port. Preferably the cellular phone 101 has a USB port (not shown) and is connected to the DLC adaptor 130 via a USB connector 120 and cable 122. The DLC adaptor 130 is connected to the existing vehicle data link connector 128 via a DLC 126 and cable 124.

Preferably the cellular phone is a compact hand held cellular phone, for example a Motorola cellular phone that is approximately 2" wide by 3½" long by 1" deep. Preferably the cellular phone has input keys 108 arranged in the configuration of a standard phone containing at least ten keys, 0 9, and preferably arranged in four rows. The first row containing keys 1, 2 and 3; the second row containing keys 4, 5, and 6; the third row containing keys 7, 8, and 9; and the fourth row containing key 0. Alternatively the input keys can be represented by a graphical display. The graphical display can be a touch screen display and activated by pressing on the screen, or displayed on a conventional display and activated by scrolling around the screen using other input keys.

Figure 1B:
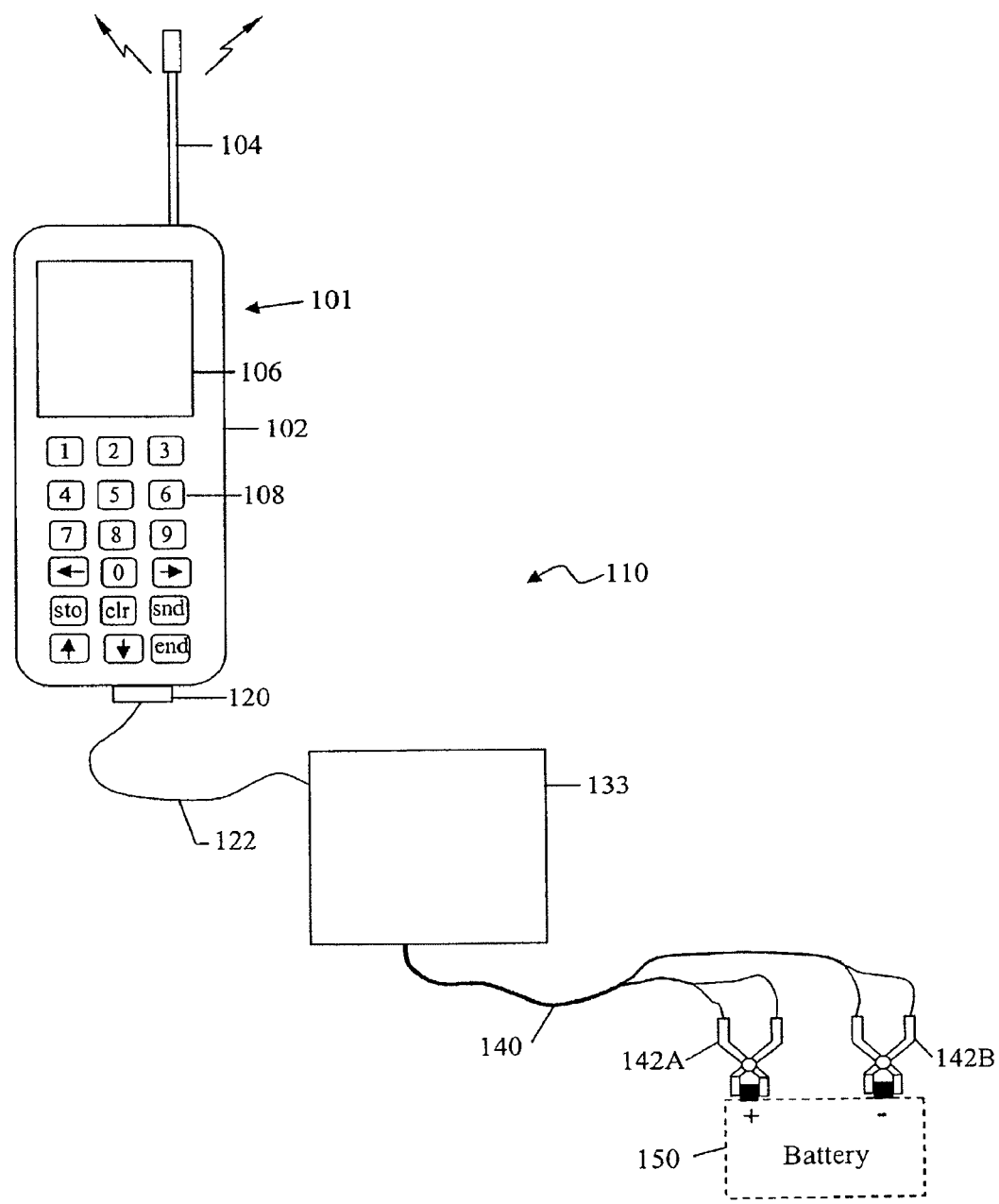
FIG. 1B is a schematic view of a cellular phone connected to a battery via an adaptor in accordance with one embodiment of the present invention.

Similarly, FIG. 1B illustrates a starter/charger tester 110 in accordance with one embodiment of the present invention and is shown connected to a battery 150. Just as above, the starter/charger tester 110 includes a cellular phone 101, a test circuit adaptor 133, and in addition the starter/charger tester 110 includes a cable 140, and clips 142A and 142B. Preferably cable 140 and clips 142 provide a Kelvin type connection between the adaptor 133 and the battery 150. A Kelvin type connection is a four (4) wire connection, wherein two wires are connected to each terminal of the battery. The test circuit adaptor 133, described in more detail below, cable 140 and clips 142A, 142B place the cellular phone in circuit communications with the battery 150.

Preferably, in addition to testing the battery, the starter/charger system tester is capable of testing the alternator and the starter motor of a vehicle. A typical starter/charger system tester is fully described in Actron's co-pending U.S. application Ser. No. 09/813,104 entitled Handheld Tester for Starting/Charging Systems, and Actron's copending continuation application also entitled Handheld Tester for Stating/Charging Systems, which are incorporated herein in their entirety.

FIG. 2 illustrates a typical cellular phone. The cellular phone 101 includes a display 106, at least one input device 210, memory 215, an interface port 220, a speaker 240, a microphone 235, and an antenna 104, all in circuit communications with at least one processor 230. Typically the display 106 is a liquid crystal display (LCD), however the display can be one or more of virtually any type of display, e.g., textual displays (such as n character by m line LCD or plasma displays, etc.), binary displays (such as LEDs, lamps, etc.), graphical displays (such as LCD displays that can display text and bar graphs and the like), etc.

The input device 210 can be any number of different inputs devices, including, but not limited to, one or more keys 108 (FIG. 1), a thumb wheel (not shown) that permits a user to quickly scroll through a list of options, a four-direction cursor controller, a touch screen, a voice activated input, or any combination thereof. The memory 215 permits the user to store information, such as names and phone numbers, that do not get erased when the battery is removed from the phone for short periods of time, and permits the cellular phone service provider to update the programming as required. The cellular phone 101 has a telecommunications circuit 225 for establishing a connection to a cellular tower and transmitting and receiving data via the antenna 104. The speaker 240 and the microphone 235 are shown connected to the processor, however, the speaker 240 and microphone 235 are often connected to the telecommunications circuit 225. Data representing a human voice is transmitted to the speaker 240 by either the telecommunications circuit 225 or the processor 230, wherein the data is communicated to a user in human hearable form. The microphone 235 transmits data representing a human voice to either the telecommunications circuit 225 or the processor 230. Data representing a human voice is transmitted/received by the telecommunications circuit 225 to/from a remote location.

In addition, the cellular phone has an interface port 220. The interface port 220 permits the user to connect the cellular phone 101 to other devices, such as a computer, in order to perform functions such as downloading new programming information, downloading sound bites, and connecting other peripheral devices. As discussed above, the interface port 220 can be any communications port.

Figure 3A:
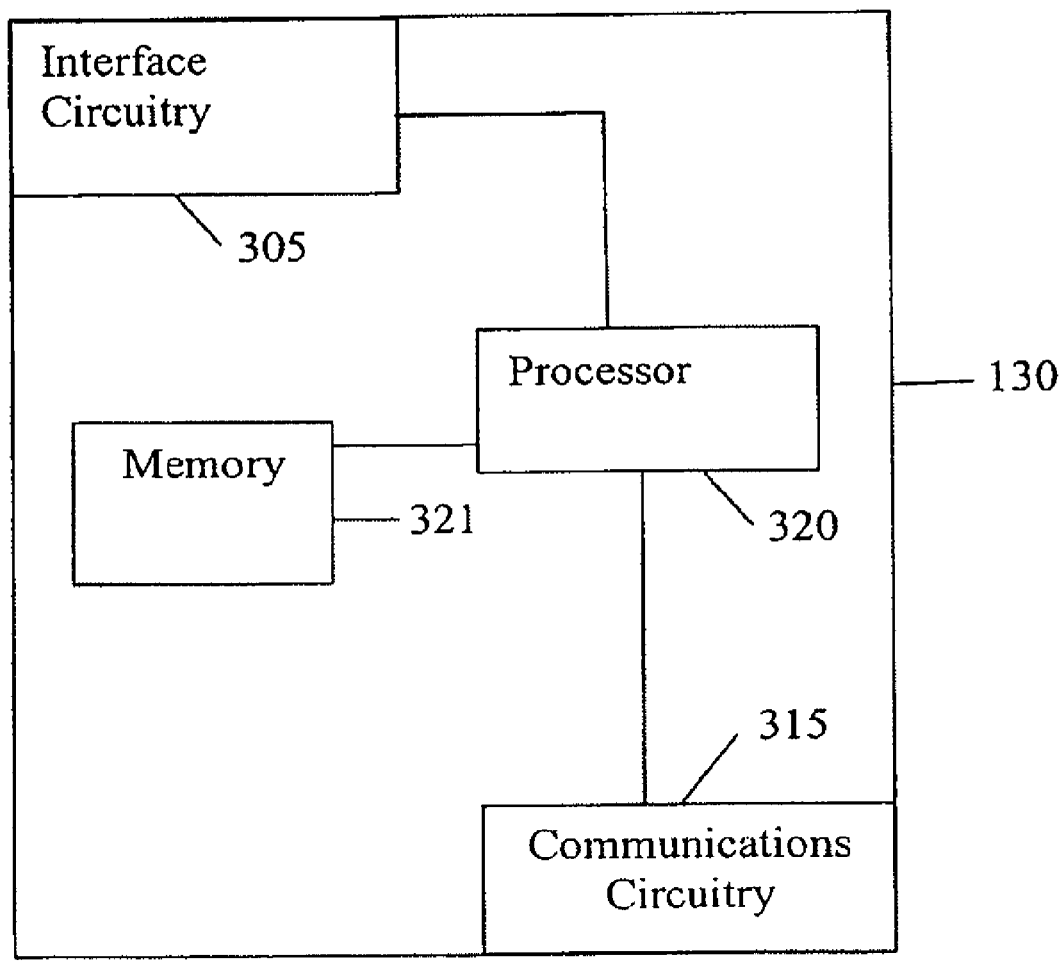
FIG. 3A is a high level block diagram of an adaptor in accordance with one embodiment of the present invention.

FIG. 3A illustrates one embodiment of an adaptor in accordance with the present invention. The DLC adaptor 130 for use with the cell phone 101 as an off-board device includes communications circuitry 315 and interface circuitry 305 in circuit communication with a processor 320. The processor circuit 320, also referred to herein as just processor 320, may be one of virtually any number of processor systems and/or stand-alone processors, such as microprocessors, microcontrollers, and digital signal processors, and has associated therewith, either internally therein or externally in circuit communication therewith, associated RAM, ROM, EPROM, clocks, decoders, memory controllers, and/or interrupt controllers, etc. (all not shown) known to those in the art to be needed to implement a processor circuit. The processor is in communication with the communications circuit 315. The communications circuitry 315, and interface circuitry 305 are shown inside the DLC adaptor 130 for convenience purposes only and it should be obvious to one skilled in the art that the circuitry could be located outside the DLC adaptor 130 in a number of convenient locations.

The communications circuit 315 generates one or more communications protocols with which the cellular phone 101 and the vehicle computer network communicate with one-another. The communications circuit 315 can be implemented either in hardware, or in software, or in a combination of hardware and software. Typical communications protocols generated by the communication circuit 315 include but are not limited to: SAE J1850 (VPM), SAE J1850 (PWM), ISO 9141-2, and ISO 14230-4 ("Keyword 2000"). The present invention is not intended to be limited to any specific communications protocol, or even to electrical communications protocols. Other present and future protocols, such as fiber optic, ISO 15765-4, MS CAN, HS CAN and wireless communications protocols such as Bluetooth protocols and 802.11b protocols, are also contemplated as being within the spirit and scope of the present invention.

The interface circuitry 305 permits the DLC adaptor 130 to be connected to the interface port 220 of the cellular phone. As noted earlier, the interface port 220 of the cellular phone can be any type of communications interface port, such as a serial port, a USB port, an infrared port, an RS 232 port, an Ethernet port, a port that is proprietary to the manufacturer of the cellular phone 101, or any other conventional communications port or wireless link, such as Bluetooth communications link. The interface circuitry 305 of the DLC adaptor 130 facilitates the connection of the interface port 220 with the DLC adaptor 130.

The DLC adaptor 130 includes memory 321 that is separate from the processor, but is in circuit communications with the processor. Preferably the memory is random access memory RAM. The DLC adaptor 130 can contain the scan tool software, error/fault codes, communications protocols etc. and simply communicate to the results of the diagnostic tests in a format corresponding to the diagnostic information to the cellular phone 101 for display. On the other hand, the function of the DLC adaptor 130 can be as simple as a communications translator, wherein the cellular phone 101 generates the communications protocol, transmits the communications to the DLC adaptor 130 via the interface port 220, e.g. a USB port, the DLC adaptor 130 receives the communications and passes the communications over a data link connector (DLC) 126 to the vehicle diagnostic system.

The DLC adaptor 130 as described above is a relatively intelligent DLC adaptor 130. The functions described above, however, can be performed in cellular phone circuitry, modified in accordance with the teachings of the present invention. Thus the adaptor could be as simple as a cable to place the cellular phone in circuit communications with the vehicle diagnostic system, or eliminated entirely by using wireless communications.

Further, the adaptor circuitry need not be in a separate device and can be built into the cellular phone wherein the user simply needs to connect the cellular phone to the existing vehicle data link. Thus, an unintelligent adaptor could be used, wherein the unintelligent adaptor merely consists of a cable with a connector on each end. One of the connectors connects to the cellular phone, and one connector, such as a DLC connector connects to the vehicle diagnostic system. In addition, vehicle manufacturers may eliminate the data link connectors located in the occupant compartment, and replace the data link connector with a wireless communications. It is within the spirit and scope of this invention that the cellular phone 101 can be connected to the vehicle diagnostic system by a wireless communications port.

Figure 3B:
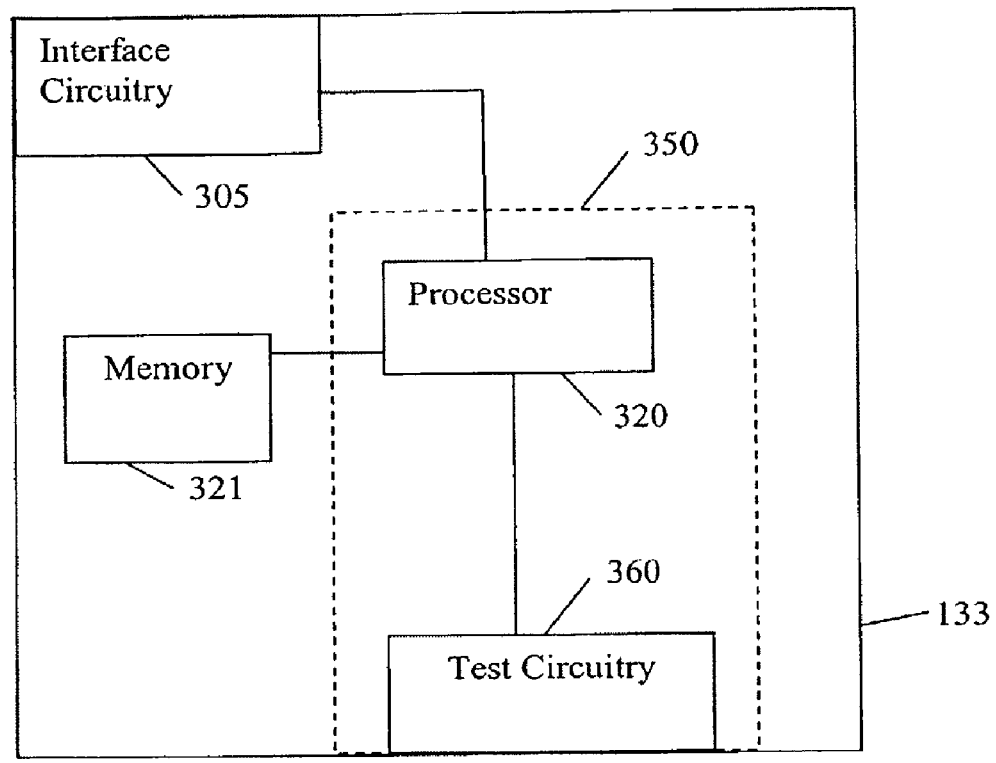
FIG. 3B is a high level block diagram of an adaptor in accordance with another embodiment of the present invention.

FIG. 3B illustrates a test circuit adaptor 133 in accordance with the present invention. Preferably the test circuit adaptor 133, for use with the cell phone 101 as a starter/charger system tester, comprises interface circuitry 305, a processor 320 and memory 321 as described above, and further includes an electronic test circuit 350 all in circuit communication. Preferably the starter/charger system tester is configured to test at least one of a starter motor, a battery and an alternator in a vehicle.

The test circuit adaptor 133, shown in FIG. 3B, preferably includes an electronic test circuit 350 that tests the starting/charging system (not shown). The test circuit 350 preferably includes a discrete test circuit 360 in circuit communication with an associated processor 320. In the alternative, the test circuit 350 can consist of discrete test circuit 360 without an associated processor circuit. Additional information relating to the function of the test circuit can be found in Actron's co-pending U.S. application Ser. No. 09/813,104 entitled Handheld Tester for Starting/Charging Systems, which is incorporated herein in its entirety.

The interface circuitry 305 permits the test circuit adaptor 133 to be connected to the interface port 220 of the cellular phone. As noted earlier, the interface port 220 of the cellular phone can be any type of communications interface port, such as a serial port, a USB port, an infrared port, an RS 232 port, an Ethernet port, a port that is proprietary to the manufacturer of the cellular phone 101, or any other conventional communications port or wireless link, such as Bluetooth communications link. The interface circuitry 305 of the test circuit adaptor 133 facilitates the connection of the interface port 220 with the test circuit adaptor 133.

The test circuit adaptor 133 includes memory 321 that is separate from the processor, but is in circuit communications with the processor. Preferably the memory is random access memory RAM. Preferably, the test circuit adaptor 133 contains the starter/charger test circuitry and executable code to diagnose the starter/charger system and simply communicate the results of the diagnostic tests in a format suitable for viewing on the cellular phone display 106. Alternatively, the cellular phone 101 can contain executable code to diagnose the starter/charger system and receive raw data from the test circuit adaptor 133 and display the results on the display 106. In addition, as will be discussed in more detail below, the starter/charger system and/or battery test results can be communicated to a second location via the cellular phone telecommunications circuit 225.

Figure 4A:
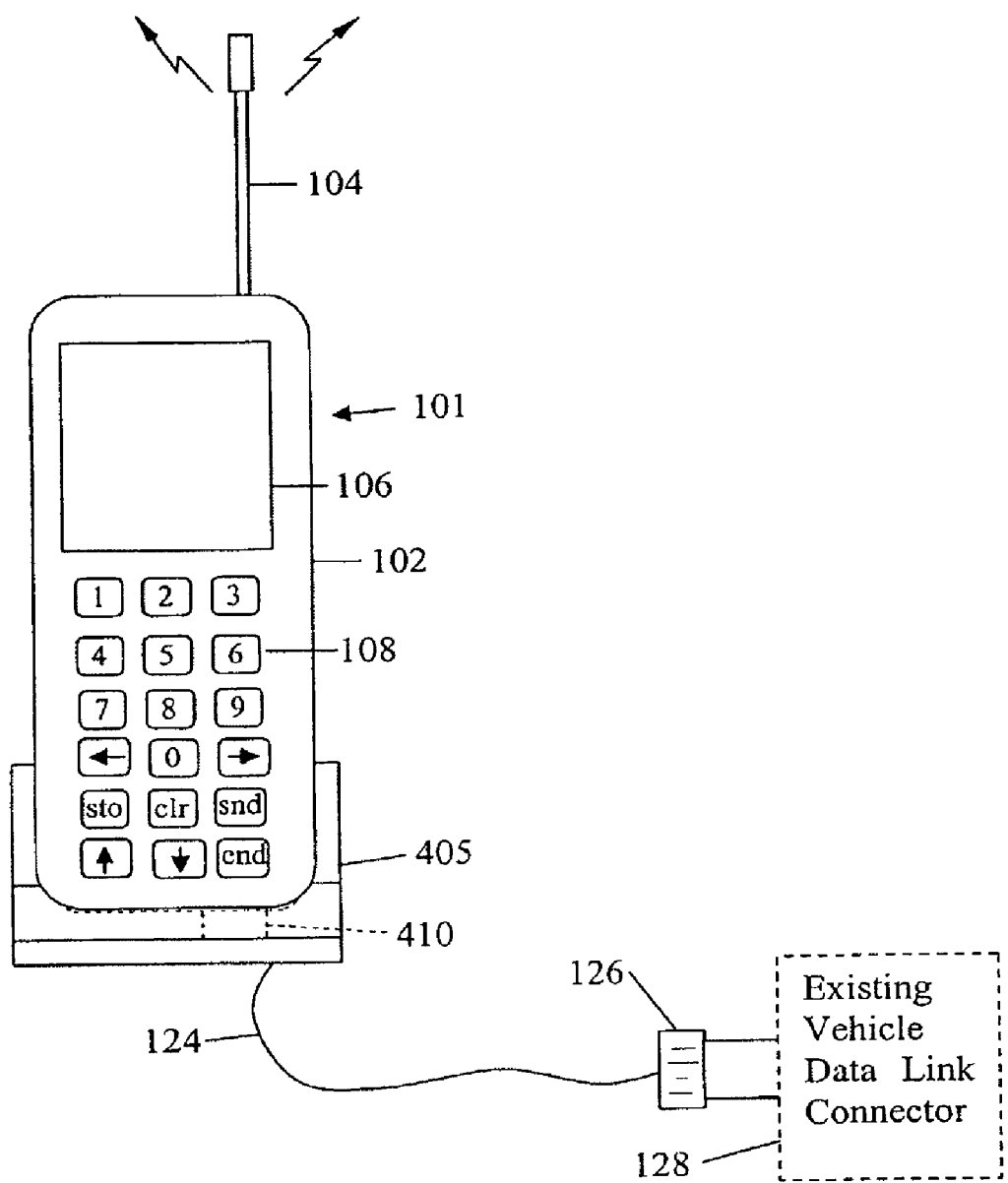
FIG. 4A is a schematic view of a cellular phone connected to an existing vehicle data link via a cradle adaptor in accordance with one embodiment of the present invention.

The embodiment illustrated in FIG. 4A is similar to that described in relation to FIG. 1A. The cellular phone 101 is in circuit communication with the vehicle diagnostic system (not shown) via vehicle data link connector 128, DLC 126, cable 124, and a cradle adaptor 405. The cradle adaptor 405 includes the circuitry described above in relation to the DLC adaptor 130 and the cradle adaptor 405 is configured to receive the cellular phone 101. The cradle adaptor 405 has a mating port 410 configured to interface with the cellular phone interface port 220 (FIG. 2). The mating port 410 can be any conventional mating port, such as a USB port, an RS 232 port, a serial port, an infrared port, or even a proprietary port, that is capable of connecting the cradle adaptor 405 to the cellular phone 101 and placing the processor 230 (FIG. 2) of the cellular phone 101 in circuit communications with the cradle adaptor 405. In most cases the cellular phone simply sits in the cradle adaptor 405 in order to establish communication with the cradle adaptor 405. In other cases the cellular phone needs to be pushed down into the cradle adaptor 405 so that the interface port 220 (FIG. 2) connects to the mating port 410.

Figure 4B:
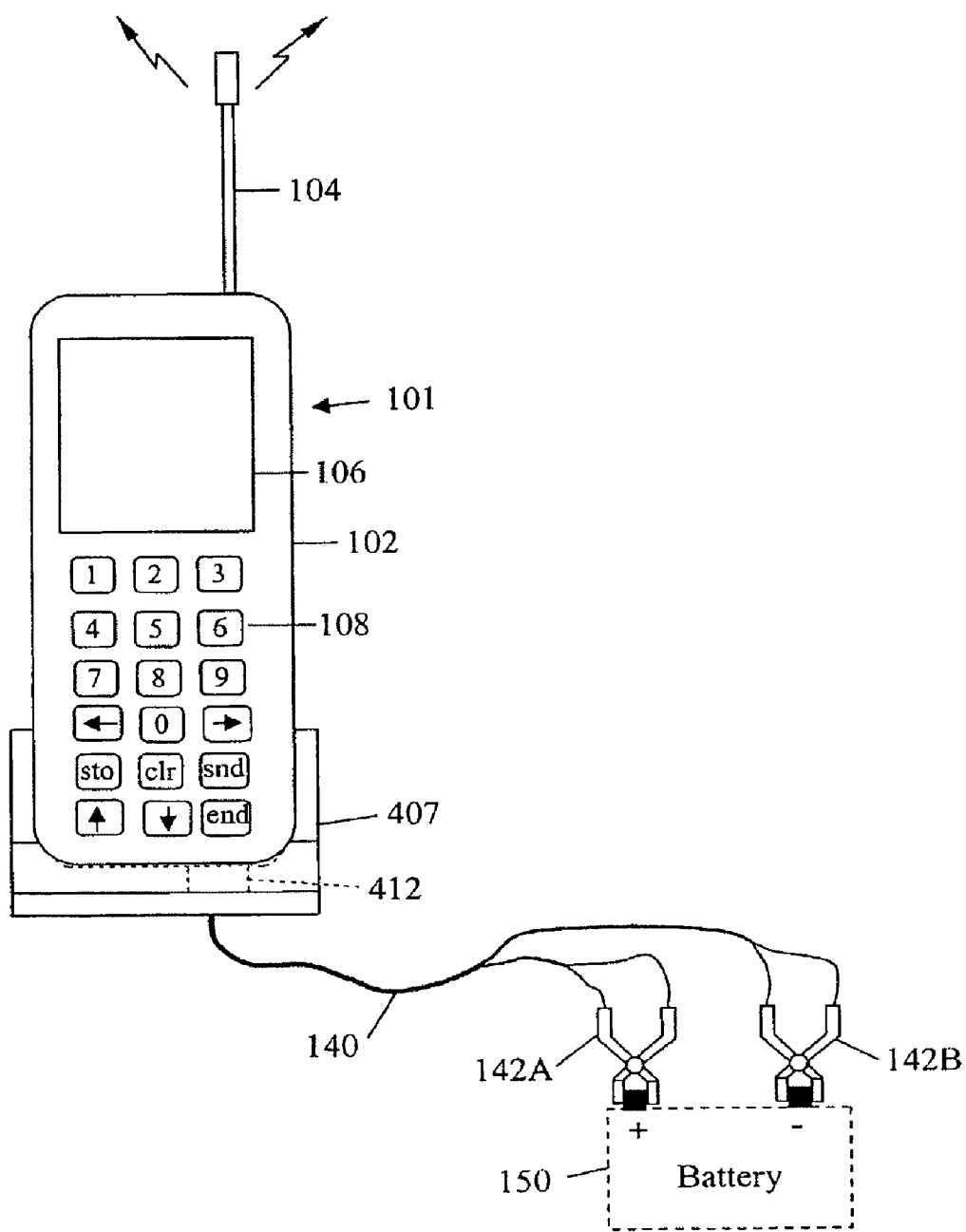
FIG. 4B is a schematic view of a cellular phone connected to a battery via a cradle adaptor in accordance with one embodiment of the present invention.

The embodiment illustrated in FIG. 4B is similar to that described in relation to FIG. 1B. The cellular phone 101 is in circuit communication with the vehicle starter/charger system and/or the battery via cable 140, clips 142A and 142B, and a cradle adaptor 407. The cradle adaptor 407 includes the circuitry described above in relation to the test circuit adaptor 133 and the cradle adaptor 407 is configured to receive the cellular phone 101. The cradle adaptor 407 has a mating port 412 configured to interface with the cellular phone interface port 220 (FIG. 2). The mating port 412 can be any conventional mating port, such as a USB port, an RS 232 port, a serial port, an infrared port, or even a proprietary port, that is capable of connecting the cradle adaptor 407 to the cellular phone 101 and placing the processor 230 (FIG. 2) of the cellular phone 101 in circuit communications with the cradle adaptor 407. In most cases the cellular phone simply sits in the cradle adaptor 407 in order to establish communication with the cradle adaptor 407. In other cases the cellular phone needs to be pushed down into the cradle adaptor 407 so that the interface port 220 (FIG. 2) connects to the mating port 412.

The adaptors have been described herein in separate embodiments, however, one adaptor can be configured to provide an interface between the cellular phone and both the vehicle diagnostic system and the starter/charger system. Further, it is also within the spirit and scope of the invention for the adaptor to have a cable to connect to the vehicle diagnostic system and a cable to connect to the starter/charger/battery system. Furthermore, it is also contemplated that the adaptor be configured with one connector for use with interchangeable leads, such that a first cable can be releasably connected to the adaptor to place the adaptor in circuit communication with the vehicle diagnostic system, and a second cable can be releasably connected to the adaptor to place the adaptor in circuit communication with the starter/charger system, or a battery.

Further, one embodiment provides for automatically detecting which cable is connected to the device, and automatically performing the correct testing function based on the type of cable connected to the device. Additional information relating to the interchangeable leads and auto-detection of the leads can be found in Actron's copending patent application Ser. No. 09/813,104, Handheld Tester for Starting/Charging Systems, which is incorporated herein in its entirety.

Figure 5:
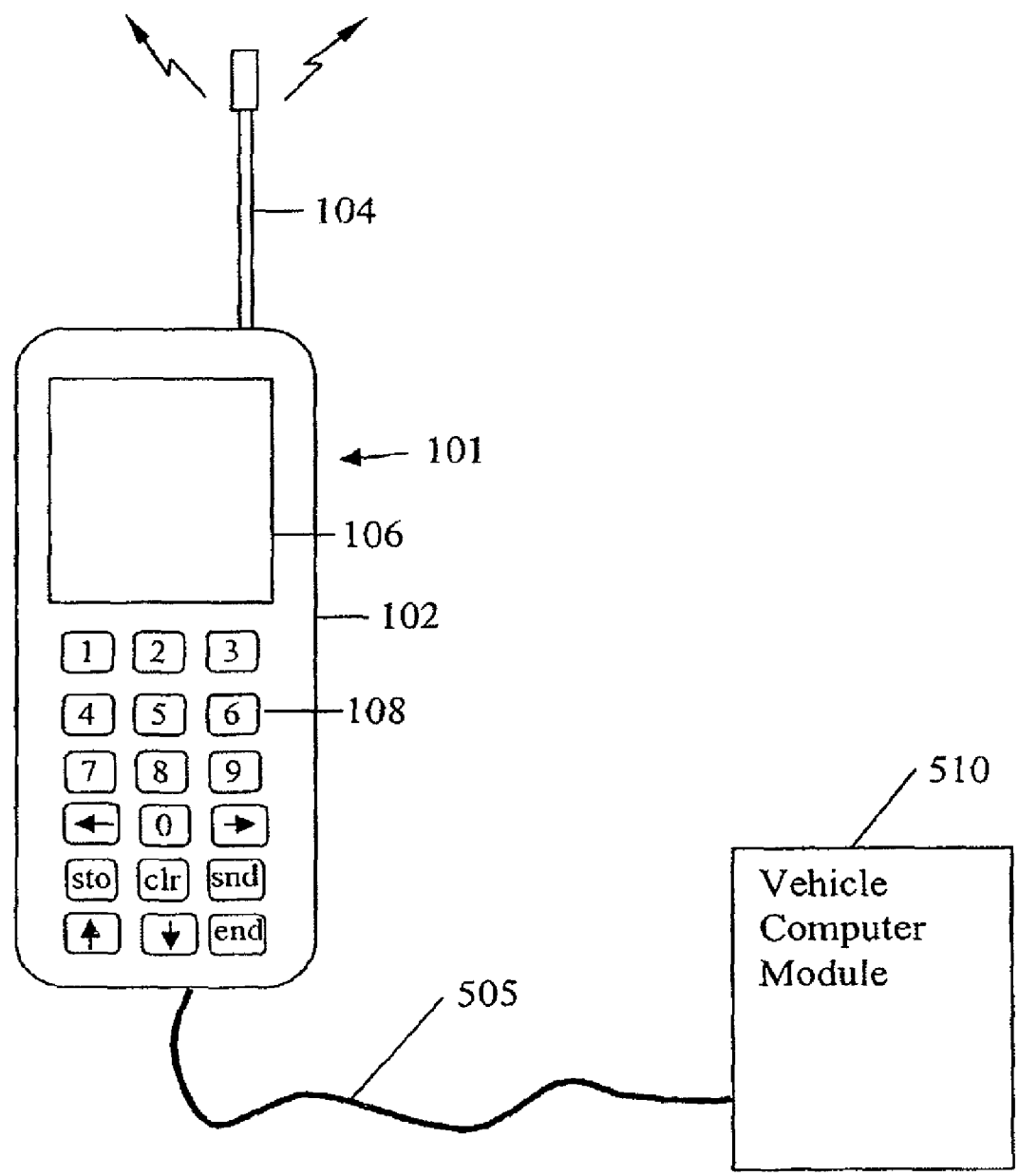
FIG. 5 is a schematic view of a cellular phone connected to a vehicle computer module in accordance with one embodiment of the present invention.

FIG. 5 illustrates one more embodiment of the present invention. The cellular phone 101 is similar to the cellular phones described above. In this embodiment, the cellular phone communicates directly with a vehicle computer module 510. The cellular phone 101 does not require an adaptor to communicate with the vehicle computer module. The communications circuit could be facilitated through a number of standard connections, such as a USB port (not shown) on the cellular phone 101 to a serial port (not shown) on the vehicle computer module. The type of connection between the cellular phone 101 and the vehicle computer module is immaterial in this embodiment so long as the communications link is established. In this respect, while the illustration depicts the communications circuit as a cable 505, the communications circuit can established in any of the methods discussed above.

Figure 6:
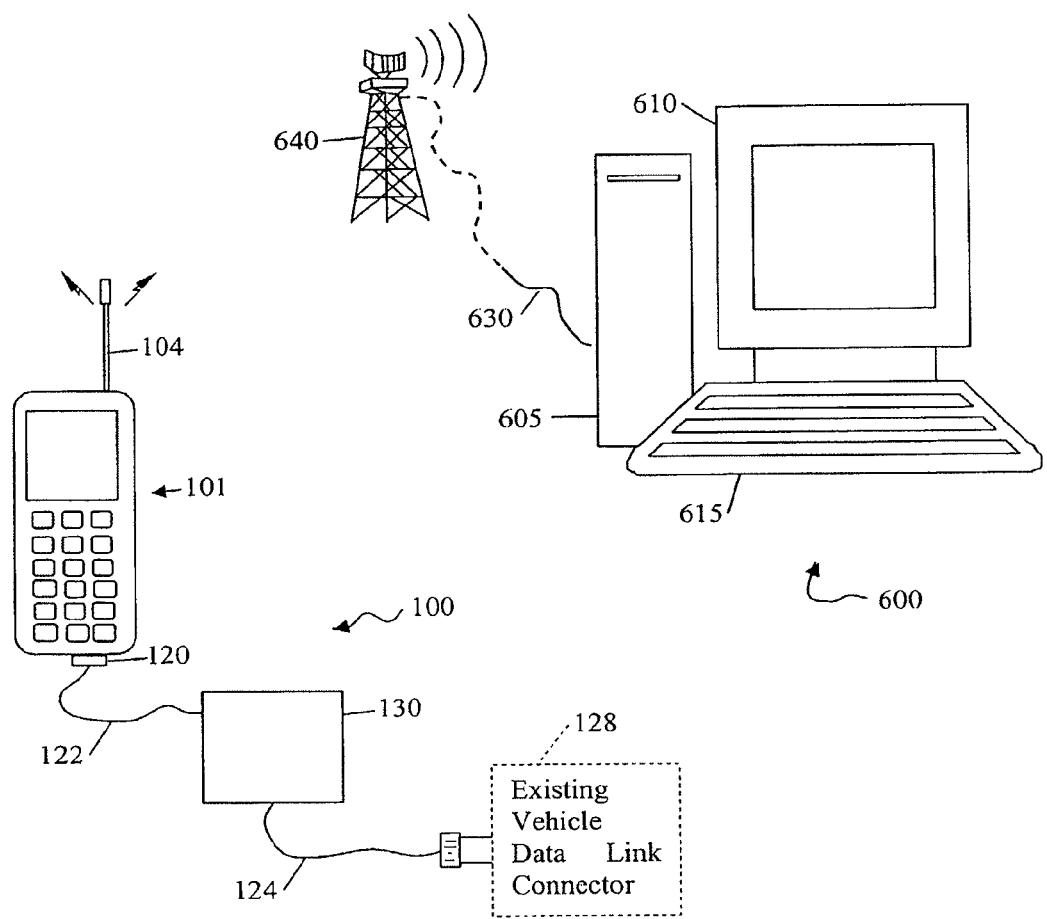
FIG. 6 is an embodiment of the present invention illustrating a central computer and phone line for transmitting signals to and receiving signals from a cellular phone.

The operation of one embodiment of the present invention is described in relation to FIG. 6. A central computer system 600 is installed up in a remote location. A central computer system is described herein; however, a plurality of remote computers that may or may not be linked together are included in the spirit and scope of the present invention. The remote computers can be stand alone computers or computers and system used by parts suppliers at various locations. The computer system 600 is a conventional computer system and includes a keyboard 615 and a monitor 610 in circuit communication with a CPU and a modem (not shown) that are located in an enclosure 605. It should be obvious to one skilled in the art that the modem is not required and the same function can be obtained using a network connection to the internet. The modem is connected to a phone line 630, which through switching stations (not shown) and other various devices is capable of communicating through one or more cellular towers 640, permitting the CPU to be in circuit communication with a cellular phone 101.

A user purchases a DLC adaptor 130 that is suitable for use with the cellular phone 101 that he/she plans on using in conjunction with DLC adaptor 130 to form the scan tool 100. After purchasing the DLC adaptor 130 the user opens the packaging and dials a phone number that is provided along with an access code in the instruction manual (not shown). The phone number connects the user to the central computer system 600 where the user is prompted to enter the access code and then select the year, make and model of one or more vehicles that he/she desires to view the vehicle diagnostic information. After receiving the required information, the computer system 600 communicates scan tool software, including the proper communications protocol and error/fault codes, for the identified vehicle to the cellular phone 101. The cellular phone 101 stores the downloaded software in its memory 215.

In the alternative, the software package can be downloaded to the DLC adaptor 130 and stored in the memory of the DLC adaptor 130, or in a combination of both the memory in the cellular phone 101 as well as the memory of the DLC adaptor 130.

In addition, the complete software packages can be distributed to a third party, such as a parts supplier, who could identify the cellular phone and the year(s), make(s) and model (s) of the vehicles to be tested and directly communicate the required software to the cellular phone 101 or the adaptor at the time of purchase, and thus eliminate the need to dial up a central computer to download the required software.

After the software is downloaded and stored on the cellular phone 101, or on the DLC adaptor 130, the user places the DLC adaptor 130 in circuit communication with the vehicle diagnostic system (not shown) by connecting the DLC 126 to the existing vehicle data link connector 128. Next the user connects the cellular phone 101 to the DLC adaptor 130 by inserting connector 120 into the interface port 220 (FIG. 2) of the cellular phone 101, by inserting the cellular phone 101 into the cradle adaptor 405 (FIG. 4), or by establishing communication in any other manner. The cellular phone 101 is turned on and the scan tool program is initiated. The scan tool program may be initiated by selecting the option on the cellular phone and pressing an input key 108, or automatically initiated by connecting the cellular phone 101 to the DLC adaptor 130.

The scan tool 100, including the cellular phone 101 and DLC adaptor 130, 405, establishes the communications link in virtually any of the known interface methods, e.g. using the method set forth in copending U.S. patent application Ser. No. 10/159,957, publication number US 2003/000463 "Scan Tool with Dropped Communication Detection and Recovery and Improved Protocol Selection," which is assigned to Actron Manufacturing and which is incorporated herein by reference in its entirety.

Depending on the intelligence of the DLC adaptor 130, either the processor 230 and communications circuitry in the cellular phone 101, or the processor 320 and communications circuitry 315 in the DLC adaptor 130, generate one or more communications protocols with which the scan tool 100 and the vehicle computer modules communicate with one-another. The communications circuit can be implemented either in hardware, or in software, or in a combination of hardware and software. Typical communications protocols generated by the communication circuit include but are not limited to: SAE J1850 (VPM), SAE J1850 (PWM), ISO 9141-2, and ISO 14230-4 ("Keyword 2000"). The present invention is not intended to be limited to any specific communications protocol, or even to electrical communications protocols. Other present and future protocols, such as fiber optic and wireless communication protocols, are also contemplated as being within the scope of the present invention.

Again, depending on the intelligence level of the adaptor, the diagnostic information received from the vehicle diagnostic system can be processed in the DLC adaptor 130 circuitry, or in the cellular phone 101 circuitry. If the DLC adaptor 130 processes the diagnostic information, the information is communicated to the cellular phone 101 via the interface circuitry 305 and the interface port 220 in a format, corresponding to the diagnostic information, ready to be viewed on the display 106. If the DLC adaptor 130 is less intelligent, the DLC adaptor 130 translates the diagnostic information and communicates the information to the cellular phone 101 via the interface circuitry 305 and interface port 220 to the processor 230 of the cellular phone 101. The processor 230 processes the information and then displays the information to the user on the display 106.

In an alternative embodiment the cellular phone 101 is configured to retrieve the diagnostic information from the existing vehicle diagnostic system in any of the methods described above. The cellular phone 101 does not have the scan tool diagnostic software downloaded and stored in its memory 215, nor in the memory of the DLC adaptor 130. The only software required in the cellular phone 101 is communications software for gathering the information from the vehicle diagnostic system. The information is communicated by the cellular phone 101 to a centralized station similar to the centralized station 500 shown in FIG. 5. The centralized station 600 receives the information and performs the diagnostic analysis and transmits the diagnosis back to the cellular phone 101. The diagnosis can be any type of information, such as a graphical display, a recommended parts list, or instructions on how to correct any faults.

The user can interpret the diagnostic information displayed on the cellular phone 101, or take the cellular phone 101 to a parts supplier who can look at the data and provide the user with the necessary parts to correct the fault or error. In addition the user can transfer or upload the diagnostic information to another computer, either though the telecommunications circuit 235, or through a plug in connector to a local computer. The information can then be sent to a third party for viewing and/or analyzing.

While the present invention has been illustrated by the description of embodiments thereof, and while the embodiments have been described in some detail, it is not the intention of the applicant to restrict or in any way limit the scope of the appended claims to such detail. Additional advantages and modifications will readily apparent to those skilled in the art. For example, a cellular phone that is permanently mounted in a vehicle can be equipped with the technology of the present invention and perform the functions of the off-board device. Another example is manufacturer installed circuitry in the vehicle connected to the vehicle data bus, wherein the circuitry automatically monitors the vehicle diagnostic system and notifies the vehicle manufacturer or dealer of any problems. The user simply receives a courtesy call from the dealer to bring the vehicle in for service. As yet another example, although specific circuitry has been shown for the cellular phone, the present invention is intended to encompass virtually any cellular phone circuitry in combination with the adaptor circuitry to implement an off-board device. Therefore, the invention in its broader aspects is not limited to the specific details, representative apparatus and methods, and illustrative examples shown and described. Accordingly, departures may be made from such details without departing from the spirit or scope of the applicant's general inventive concept.

What is claimed is:

1. A method of retrieving diagnostic information from a vehicle, comprising the steps of:
   connecting a cellular phone with an adaptor configured to connect with a vehicle diagnostic system;
   connecting the adaptor with the vehicle diagnostic system;
   communicating with the vehicle diagnostic system with a communications circuit of the adaptor;
   retrieving the vehicle diagnostic information with a processor in the adaptor; and
   processing the vehicle diagnostic information with the processor of the adaptor.

2. The method of claim 1 further comprising:
   displaying the processed diagnostic information on a display of the cellular phone.

3. The method of claim 1 further comprising the steps of:
   sending the processed diagnostic information to a remote device with a telecommunications circuit on the cellular phone; and
   displaying the processed diagnostic information on a display of the remote device.

4. The method of claim 1, wherein the connecting the cellular phone with the adaptor is via a wireless or wired connection.

5. The method of claim 1, wherein the communication circuit generates a vehicle communication protocol.

6. The method of claim 1 further comprising the step of:
   sending the processed diagnostic information to a remote location via the adaptor.

7. A vehicle interface adaptor for communicating vehicle diagnostic information, comprising:
   a processor that processes the vehicle diagnostic information;
   a memory that stores the vehicle diagnostic information and a diagnostic software, the memory communicates with the processor;
   a communication circuitry that communicates with a vehicle diagnostic system and a remote computing device, wherein the remote computing device is a cellular phone;
   a vehicle communication interface that connects with a data link connector in a vehicle; and
   a housing that houses the processor, the memory, the communication circuitry and the vehicle communication interface.

8. The adaptor of claim 7, wherein the vehicle communication interface is the only external connection of the adaptor.

9. The adaptor of claim 7, wherein the communication circuitry communicates to the remote computing device via a wired or wireless connection.

10. The adaptor of claim 7 further comprising:
    a battery interface that connects to a vehicle battery.

11. The adaptor of claim 7 further comprising:
    a testing interface that connects with a starter/charger system of the vehicle.

12. The adaptor of claim 10, wherein the adaptor automatically determines an active connection between the vehicle communication interface and the battery interface.

13. The adaptor of claim 11, wherein the adaptor automatically determines the active connection between the vehicle communication interface and the testing interface.

* * * * *